United States Patent
Jafarian et al.

(10) Patent No.: US 9,247,526 B2
(45) Date of Patent: Jan. 26, 2016

(54) SYSTEMS AND METHODS FOR PAGING MESSAGE ENHANCEMENT

(71) Applicant: QUALCOMM Incorporated, San Diego, CA (US)

(72) Inventors: Amin Jafarian, San Diego, CA (US); Santosh Paul Abraham, San Diego, CA (US); Alfred Asterjadhi, Chicago, IL (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/800,240

(22) Filed: Mar. 13, 2013

(65) Prior Publication Data

US 2013/0303202 A1     Nov. 14, 2013

Related U.S. Application Data

(60) Provisional application No. 61/644,027, filed on May 8, 2012, provisional application No. 61/647,625, filed on May 16, 2012.

(51) Int. Cl.
    *H04W 68/00*     (2009.01)
    *H04W 52/02*     (2009.01)

(52) U.S. Cl.
    CPC .......... *H04W 68/00* (2013.01); *H04W 52/0216* (2013.01); *Y02B 60/50* (2013.01)

(58) Field of Classification Search
    CPC ...... H04R 68/00; H04R 68/02; H04R 68/025; H04R 88/02; H04R 84/20; H04R 68/06; H04R 68/12; H04R 84/045; H04R 84/18; H04R 88/04; H04R 88/06

USPC ......................................................... 455/458
See application file for complete search history.

(56) References Cited

U.S. PATENT DOCUMENTS 6,463,307 B1 * 10/2002 Larsson et al. ................ 455/574
8,274,939 B2     9/2012 Park et al.
(Continued)

FOREIGN PATENT DOCUMENTS

WO     2005022781 A1     3/2005

OTHER PUBLICATIONS

3GPP, 3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 8) 3GPP TS 44.060 V8.8.0, 2010, 591pgs.

(Continued)

*Primary Examiner* — Daniel Lai
(74) *Attorney, Agent, or Firm* — Kevin T. Cheatham

(57) ABSTRACT

This disclosure describes systems, methods, and devices for paging message enhancement, for example, by allowing packets to accumulate in an access point before sending them to a station. In some implementations, a station may not have an immediate use for a packet waiting in an access point's buffer. The station may save energy and reduce medium occupancy by allowing packets to accumulate at the access point and then receiving the accumulated packets in accordance with certain criteria. Such criteria for accumulation may be based on a Quality of Service (QoS) category, the station address, or the station type. The station may set accumulation parameters, such as a maximum occupied buffer size or a maximum time for which a station's packets are delayed for accumulation.

47 Claims, 8 Drawing Sheets

(56) References Cited

U.S. PATENT DOCUMENTS

| | | |
|---|---|---|
| 2003/0156594 A1* | 8/2003 | Trott et al. .................... 370/442 |
| 2004/0254980 A1* | 12/2004 | Motegi et al. ................. 709/203 |
| 2006/0025134 A1 | 2/2006 | Cho et al. |
| 2007/0171850 A1* | 7/2007 | Feder et al. .................... 370/311 |
| 2007/0237104 A1 | 10/2007 | Alon et al. |
| 2007/0297438 A1 | 12/2007 | Meylan et al. |
| 2008/0019373 A1 | 1/2008 | Filipovich et al. |
| 2008/0051116 A1* | 2/2008 | Willey .......................... 455/458 |
| 2008/0182596 A1 | 7/2008 | Wang et al. |
| 2008/0219228 A1 | 9/2008 | Seok et al. |
| 2008/0225760 A1* | 9/2008 | Iyer et al. ..................... 370/310 |
| 2009/0286528 A1* | 11/2009 | Lie et al. ..................... 455/422.1 |
| 2010/0002665 A1 | 1/2010 | Oguchi |
| 2010/0124223 A1* | 5/2010 | Gibbs et al. ................... 370/389 |
| 2010/0130237 A1 | 5/2010 | Kitazoe et al. |
| 2011/0310804 A1* | 12/2011 | Beygzadeh .................... 370/328 |
| 2012/0082032 A1 | 4/2012 | Chen |
| 2012/0157132 A1 | 6/2012 | Olsson et al. |
| 2012/0282937 A1 | 11/2012 | He et al. |

OTHER PUBLICATIONS

International Search Report and Written Opinion—PCT/US2013/040099—ISA/EPO—Aug. 12, 2013.

* cited by examiner

SYSTEMS AND METHODS FOR PAGING MESSAGE ENHANCEMENT

RELATED APPLICATIONS

This application claims priority to U.S. Provisional Application No. 61/644,027 filed on May 8, 2012, and to U.S. Provisional Application No. 61/647,625 filed on May 16, 2012, both of which are hereby incorporated by reference in their entirety.

BACKGROUND

1. Field

The present application relates generally to wireless communications, and more specifically to systems, methods, and devices for enhancing information delivery in a wireless communication network.

2. Description of the Related Technology

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a doze or sleep state to conserve power, where the devices do not actively transmit/receive information in the doze state. These devices may further utilize paging messages to determine when to wake up from a doze state and enter an awake state in order to transmit/receive data. Thus, improved systems, methods, and devices for enhancing paging messages are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides a method for wireless communications. The method includes transmitting, by a wireless device, a first frame including at least one field indicating one or more paging message transmission criteria. The method further includes receiving, at the wireless device, a first paging message indicating a first set of data satisfying the one or more paging message transmission criteria is available for transmission to the wireless device. For some implementations, the method further includes operating, by the wireless device, in a first state in response to receiving the first paging message, wherein the wireless device is configured to receive the first set of data when operating in the first state. For some implementations, the method further includes receiving, by the wireless device, the first set of data.

For some implementations, the first frame further comprises parameters indicating a buffer threshold requirement. For some implementations, the method further includes receiving the first paging message in response to the buffer threshold requirement being satisfied. For some implementations, the buffer threshold requirement is a maximum occupied buffer size. For some implementations, the buffer threshold requirement is a maximum time limit. For some implementations, the method further includes operating, by the wireless device, in a second state, wherein the wireless device is configured to not receive the first set of data when operating in the second state. For some implementations, the method includes transitioning, by the wireless device, from the second state to the first state in response to receiving a second paging message indicating a second set of data satisfying the one or more paging message transmission criteria is available for transmission to the wireless device. For some implementations, the method further includes receiving, by the wireless device, the second set of data. For some implementations, the one or more paging message transmission criteria comprise one or more categories of data. For some implementations, the one or more categories of data include quality of service access categories. For some implementations, the one or more paging message transmission criteria comprise an amount of time the wireless device is in the second state. For some implementations, the first frame comprises a management frame. For some implementations, the first frame is transmitted when the wireless device is associated with an access point of a wireless network.

Another aspect of this disclosure provides a wireless device comprising a transmitter configured to transmit a first frame including at least one field indicating one or more paging message transmission criteria. The wireless device further comprises a receiver configured to receive a first paging message indicating a first set of data satisfying the one or more paging message transmission criteria is available for transmission to the wireless device. For some implementations, the wireless device further comprises a processor configured to operate the wireless device in a first state in response to receiving the first paging message, wherein the receiver is further configured to receive the first set of data when operating in the first state. For some implementations, the first frame further comprises parameters indicating a buffer threshold requirement. For some implementations, the receiver is further configured to receive the first paging message in response to the buffer threshold requirement being satisfied. For some implementations, the wireless device further comprises a processor configured to operate the wireless device in a second state, wherein the receiver is configured to not receive the first set of data when operating in the second state. For some implementations, the one or more paging message transmission criteria comprise an amount of time the wireless device is in the second state.

Another aspect of this disclosure provides an apparatus for wireless communications. The apparatus comprises means for transmitting a first frame including at least one field indicating one or more paging message transmission criteria. The apparatus further comprises means for receiving a first paging message indicating a first set of data satisfying the one or more paging message transmission criteria is available for transmission to the apparatus. The apparatus further comprises means for operating in a first state in response to receiving the first paging message, wherein the means for receiving is further configured to receive the first set of data when operating in the first state. The apparatus further comprises means for operating in a second state wherein the receiver is configured to not receive the first set of data while operating in the second state.

Another aspect of this disclosure provides a non-transitory computer-readable medium comprising code. When executed by one or more processors, the code causes an apparatus to transmit a first frame including at least one field indicating one or more paging message transmission criteria. When executed by one or more processors, the code causes an apparatus to receive a first paging message indicating a first set of data satisfying the one or more paging message transmission criteria is available for transmission to the wireless device. When executed by one or more processors, the code causes an apparatus to operate in a first state in response to receiving the first paging message, wherein the means for receiving is further configured to receive the first set of data.

For some implementations, when executed by one or more processors, the code causes the apparatus to operate in a second state wherein the wireless device is configured to not receive the first set of data when operating in the second state, transition from the second state to the first state in response to receiving a second paging message indicating a second set of data satisfying the one or more paging message transmission criteria is available for transmission to the wireless device, and receive the second set of data.

Another aspect of this disclosure provides a method for wireless communications. The method includes receiving, from a wireless device, a first frame including at least one field indicating one or more paging message transmission criteria, including the wireless device in a paging message in accordance with the one or more paging message transmission criteria. The method further includes transmitting the paging message to the wireless device. For some implementations, the paging message indicates to the wireless device that a first set of data satisfying the one or more paging message transmission criteria is available for transmission to the wireless device. For some implementations, the method further includes transmitting the first set of data to the wireless device.

For some implementations, the method further includes buffering a second set of data available for transmission to the wireless device, wherein the second set of data does not satisfy the one or more paging message transmission criteria. For some implementations, the method further includes determining a buffer threshold requirement. For some implementations, the method further includes transmitting the paging message to the wireless device in response to the buffer threshold requirement being met. For some implementations, the method further includes transmitting the second set of data to the wireless device in response to the buffer threshold requirement being met. For some implementations, the buffer threshold requirement is a maximum occupied buffer size. For some implementations, the buffer threshold requirement is a maximum time limit.

For some implementations, the one or more paging message transmission criteria comprise one or more categories of data. For some implementations, the one or more categories of data include quality of service access categories. For some implementations, the one or more paging message transmission criteria comprise an amount of time the wireless device is operating in a second state, wherein the wireless device is configured to not receive the first set of data while operating in the second state. For some implementations, the method further comprises adding a quality of service access category to the paging message. For some implementations, the method further comprises determining an order of paged wireless devices according to one or more quality of service access categories. For some implementations, the method further comprises determining a grouping of wireless devices according to one or more quality of service access categories. For some implementations, the method further comprises dividing the paging message into a plurality of blocks, wherein each block of the plurality of blocks corresponds to a group of wireless devices. For some implementations, the method further comprises appending a quality of service access category to each block of the plurality of blocks.

Another aspect of this disclosure provides a network device. The network device comprises a receiver configured to receive, from a wireless device, a first frame including at least one field indicating one or more paging message transmission criteria. The network device further comprises a processor configured to include the wireless device in a paging message in accordance with the one or more paging message transmission criteria. The network device further comprises a transmitter configured to transmit the paging message to the wireless device. For some implementations, the paging message indicates to the wireless device that a first set of data satisfying the one or more paging message transmission criteria is available for transmission to the wireless device. For some implementations, the transmitter is further configured to transmit the first set of data to the wireless device.

For some implementations, the processor is further configured to buffer a second set of data available for transmission to the wireless device, wherein the second set of data does not satisfy the one or more paging message transmission criteria. For some implementations, the processor is further configured to determine a buffer threshold requirement. For some implementations the transmitter is further configured to transmit the paging message to the wireless device in response to the buffer threshold requirement being met. For some implementations, the transmitter is further configured to transmit the second set of data to the wireless device in response to the buffer threshold requirement being met. For some implementations, the one or more paging message transmission criteria comprise an amount of time the wireless device is operating in a second state, wherein the wireless device is configured to not receive the first set of data when operating in the second state.

For some implementations, the processor is further configured to add a quality of service access category to the paging message. For some implementations, the processor is further configured to determine an order of paged wireless devices according to one or more quality of service access categories. For some implementations, the processor is further configured to determine a grouping of wireless devices according to one or more quality of service access categories. For some implementations, the processor is further configured to divide the paging message into a plurality of blocks, wherein each block of the plurality of blocks corresponds to a group of wireless devices. For some implementations, the processor is further configured to append a quality of service access category to each block of the plurality of blocks.

Another aspect of this disclosure provides an apparatus for wireless communications comprising means for receiving, from a wireless device, a first frame including at least one field indicating one or more paging message transmission criteria. The apparatus further comprises means for including the wireless device in a paging message in accordance with the one or more paging message transmission criteria. The apparatus further comprises means for transmitting the paging message to the wireless device in response to the buffer threshold requirement being met. The apparatus further comprises means for buffering a second set of data available for transmission to the wireless device, wherein the second set of data does not satisfy the one or more paging message transmission criteria. The apparatus further comprises means for determining a buffer threshold requirement, wherein the means for transmitting is further configured to transmit the paging message to the wireless device.

For some implementations, the paging message indicates to the wireless device that a first set of data satisfying the one or more paging message transmission criteria is available for transmission to the wireless device. For some implementations, the one or more paging message transmission criteria comprise an amount of time the wireless device is operating in a second state, wherein the wireless device is configured to not receive the first set of data while operating in the second state.

Another aspect of this disclosure provides a non-transitory computer-readable medium comprising code. When executed by one or more processors, the code causes an apparatus to receive, from a wireless device, a first frame including at least one field indicating one or more paging message transmission criteria. When executed by one or more processors, the code causes an apparatus to receive, from a wireless device, a first frame including at least one field indicating one or more paging message transmission criteria. When executed by one or more processors, the code causes an apparatus to include the wireless device in a paging message in accordance with the one or more paging message transmission criteria. When executed by one or more processors, the code causes an apparatus to transmit the paging message to the wireless device in response to the buffer threshold requirement being met. When executed by one or more processors, the code causes an apparatus to transmit the second set of data to the wireless device in response to the buffer threshold requirement being met.

For some implementation, when executed by one or more processors, the code causes an apparatus to divide the paging message into a plurality of blocks, wherein each block of the plurality of blocks corresponds to a group of wireless devices. For some implementations, when executed by one or more processors, the code causes an apparatus to append a quality of service access category to each block of the plurality of blocks.

DETAILED DESCRIPTION

Figure 1:
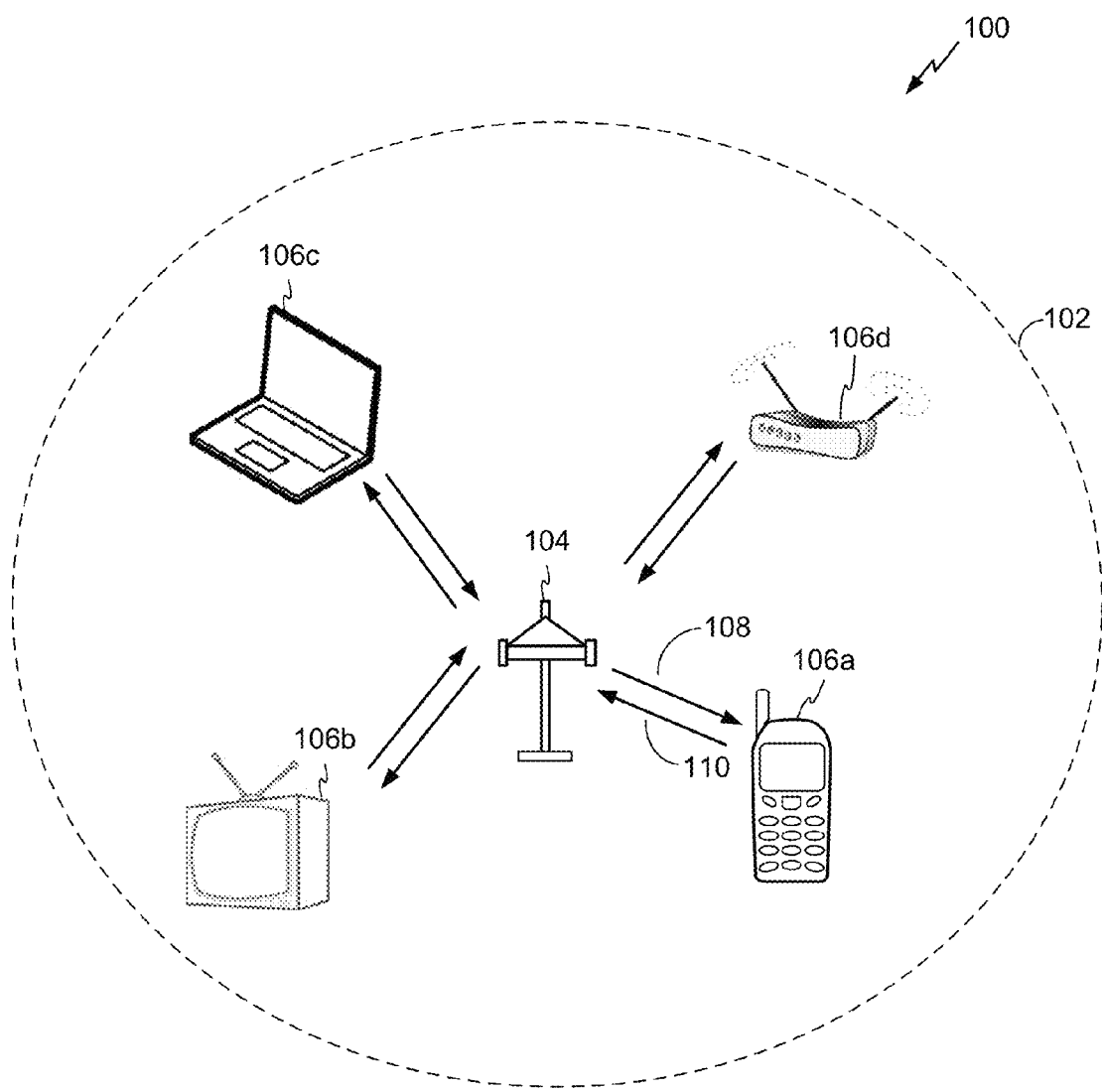
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a wireless local area network includes various devices which are the components that access the wireless network. For example, there may be two types of devices: access points ("APs") and clients (also referred to as stations, or "STAs"). In general, an access point may serve as a hub or base station for the wireless local area network and a station serves as a user of the wireless local area network. For example, a station may be a laptop computer, a personal digital assistant (PDA), a mobile phone, a tablet computer, a sensor, etc. In an example, a station connects to an access point via a WiFi (e.g., IEEE 802.11 protocol such as 802.11ah) compliant wireless link to obtain general connectivity to the Internet or to other wide area networks. In some implementations a station may also be used as an access point.

An access point may also include, be implemented as, or known as a NodeB, Radio Network Controller, eNodeB, Base Station Controller, Base Transceiver Station, Base Station, Transceiver Function, Radio Router, Radio Transceiver, or some other terminology.

A station may also include, be implemented as, or known as an access terminal, a subscriber station, a subscriber unit, a mobile station, a remote station, a remote terminal, a user terminal, a user agent, a user device, user equipment, or some other terminology. In some implementations an access terminal may include a cellular telephone, a cordless telephone, a Session Initiation Protocol phone, a wireless local loop station, a personal digital assistant, a tablet, a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a tablet, a global positioning system device, or any other suitable device that is configured to communicate via a wireless medium.

As discussed above, certain of the devices described herein may implement the 802.11ah standard, for example. Such devices, whether used as a station or access point or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

When an access point has at least one packet for a station, the access point indicates that there's traffic for that station in a traffic indication map (TIM). The station responds by sending a PS Poll to get the packet. The access point sends the packet to the station.

A station may not have an immediate use for a packet waiting in an access point's buffer. The station can save energy and reduce medium occupancy by allowing packets to accumulate. Criterion for accumulation could be based on a Quality of Service (QoS) category, the station address, or the station type. The station can set accumulation parameters, such as a maximum occupied buffer size or a maximum time for which a station's packets are delayed for accumulation.

Quality of Service (QoS) functionality for traffic in a wireless network includes prioritizing by access category, including voice, video, best effort, and background. Data packets transmitted by stations and access points are prioritized based on the particular access category and/or its priority value. For example, voice may be less tolerant to packet delays and thus may be given priority over video. As a result, voice packets may have a higher probability of being transmitted successfully than video packets by having a higher priority on the transmission channel. This may be accomplished by giving higher priority traffic a shorter transmit wait time than lower priority traffic. In some aspects, the transmit opportunity for a station may be longer when it is transmitting packets having a higher priority access category than if it is transmitting lower priority packets. In some aspects, the quality of service functionality may be implemented in the media access control (MAC) layer.

Wireless devices may be configured to transmit and receive messages, which may be referred to as "paging messages" that are configured to indicate to wireless devices whether or not the wireless devices need to wake up from a doze state and enter an awake state as discussed below.

The station may have a plurality of operational modes. In the active mode, the station may always be in an "awake" state and actively transmit/receive data with the access point. In power save mode, the station may be in the "awake" state or a "doze" or "sleep" state where the station does not actively transmit/receive data with the access point. Further, in the power save mode, the station may occasionally enter the awake state to listen to paging messages from the access point that indicate whether or not the station needs to enter the awake state to transmit/receive data with the access point.

The access point may transmit paging messages to a plurality of stations in a power save mode in the same network as the access point, indicating whether or not there is buffered data for the stations. The stations may use this information to determine whether they need to be in an awake state or a doze state. If a station is not being paged, it may enter a doze state. Alternatively, if the station determines it may be paged, the station may enter an awake state for a certain period of time to receive the page and further determine when to be in an awake state based on the page. Further, the station may stay in the awake state for a certain period of time after receiving the page. In another example, the station may be configured to function in other ways when being paged or not being paged that are consistent with this disclosure.

In some aspects, paging messages may include a bitmap, such as a traffic indication map (TIM). The bitmap may include a number of bits. These paging messages may be sent from the access point to stations in a beacon or a traffic indication map frame. Each bit in the bitmap may correspond to a particular station of a plurality of stations, and the value of each bit (e.g., 0 or 1) may indicate the state the corresponding station should be in (e.g., doze state or awake state) to be able to receive Buffered Units (BUs) that the access point has for that particular station. Accordingly, the size of the bitmap may be directly proportional to the number of stations in the wireless communications system 100. Therefore, a large number of stations in the wireless communications system 100 may result in a large bitmap.

In some aspects, stations that sleep for a long time may not wake up to read any traffic indication map messages. For example, a station can decide to sleep through one or more traffic indication map messages in an extended sleep mode. In this case, the station may advertise to the access point that the station may not read any traffic indication map messages. Accordingly, the access point may not include the corresponding identifiers in the traffic indication map message. In various embodiments, the stations can notify the access point that they may not wake up for one or more traffic indication map messages (i.e., that they are operating in the aforementioned power saving mode) using a control message, or immediately during association.

For stations that have notified the access point in this manner, the access point may not include identifiers in the traffic indication map message, even when it has buffered units intended for them. Stations may claim their buffered units by sending a PS-Poll at any time to the access point. In an embodiment, access point may immediately send the buffered unit in response to the PS-Poll. In another embodiment, the access point may respond to the PS-Poll with an ACK, and deliver the buffered unit at a later time. In yet another embodiment, the access point may not immediately respond (neither with ACK nor with buffered unit) to a PS-Poll. The access point may instead reply with a cumulative ACK frame sent after a given scheduled time after the traffic indication map message.

In various embodiments, the station can specify the waiting time to deliver the buffered unit via the PS-Poll (for a dynamic indication), an association request, a probe request, and/or another management frame sent to the AP (for a static indication). In other embodiments, the access point can specify the waiting time to deliver the buffered unit via an ACK frame, a traffic indication map element (for a dynamic indication), a beacon, an association response, a probe response, or other management frames sent to the station (for a static indication). The station may go to sleep for the waiting time duration. The station may acknowledge correct reception of the buffered unit by sending an ACK. The station may then go back to sleep.

The paging messages may be sent in a traffic indication map frame, a beacon, or using some other appropriate signaling. They may indicate a particular station in the paging message. The stations may be configured to listen to one or more paging messages. The stations may be configured to transmit requests to the access point and receive a response from the access point. For example, one or more stations may transmit a PS-Poll at any time to the access point to claim Buffered Units (BUs) that the access point has to send to the paged stations.

Transmissions of PS-Polls by stations require large amounts of energy and may occupy airtime, may potentially cause collisions by increasing the medium occupancy, and may further introduce delay into the network. For example, the paging process may result in a high number of stations receiving the one or more paging messages 302. As a result, for example, a high number of stations indicated in the same traffic indication map may receive the one or more paging messages which may lead to one or more stations contending to transmit requests to the access point on the medium after receiving the traffic indication map. Accordingly, collisions resulting in corrupted data received by the access point may occur in situations in which at least two stations attempt to transmit requests to the access point at or nearly at a same time.

Accordingly, systems and methods are described herein for enhancing paging messages by filtering the type of data that is transmitted to and from stations and/or access point and for accumulating buffered data. The use of such enhanced paging messages allows for less power to be consumed by stations and reduces the amount of airtime, medium occupancy, and delay that is introduced into the network. For example, the stations may not have an immediate use for a Buffered data Unit (BU) that is available for it at the access point. Therefore, to save energy and to reduce the potential for collisions, packets available for a station may be accumulated in the access point buffer until particular criteria is satisfied.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an access point 104, which communicates with stations 106.

A variety of processes and methods may be used for transmissions in the wireless communication system 100 between the access point 104 and the stations 106. For example, signals may be sent and received between the access point 104 and the stations 106 in accordance with OFDM/OFDMA techniques. If this is the case, the wireless communication system 100 may be referred to as an OFDM/OFDMA system. Alternatively, signals may be sent and received between the access point 104 and the stations 106 in accordance with code division multiple access (CDMA) techniques. If this is the case, the wireless communication system 100 may be referred to as a CDMA system.

A communication link that facilitates transmission from the access point 104 to one or more of the stations 106 may be referred to as a downlink (DL) 108, and a communication link that facilitates transmission from one or more of the stations 106 to the access point 104 may be referred to as an uplink (UL) 110. Alternatively, a downlink 108 may be referred to as a forward link or a forward channel, and an uplink 110 may be referred to as a reverse link or a reverse channel.

The access point 104 may act as a base station and provide wireless communication coverage in a basic service area 102. The access point 104 along with the stations 106 associated with the access point 104 and that use the access point 104 for communication may be referred to as a basic service set. It should be noted that the wireless communication system 100 may not have a central access point 104, but rather may function as a peer-to-peer network between the stations 106. Accordingly, the functions of the access point 104 described herein may alternatively be performed by one or more of the stations 106.

The access point 104 may transmit a beacon signal (or a "beacon frame" or a "beacon"), via a communication link such as the downlink 108, to stations 106 of the system 100, which may help the stations 106 to synchronize their timing with the access point 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a station 106 may be required to associate with the access point 104 in order to send communications to and/or receive communications from the access point 104. In one aspect, information for associating is included in a beacon signal broadcast by the access point 104. To receive such a beacon, the station 106 may, for example, perform a broad coverage search over a coverage region. A search may also be performed by the station 106 by sweeping a coverage region in a lighthouse fashion, for example. After receiving the information for associating, the station 106 may transmit a reference signal, such as an association probe or request, to the access point 104. The access point 104 may process the association request and may determine whether the station 106 is permitted to associate with the access point 104. In one aspect, the access point 104 may respond to the station 106 with an association identification (AID) used to identify the station 106 for delivery of buffered data frames. Upon being granted association with the access point 104, the station 106 may be able to exchange data with the access point 104. In some aspects, the access point 104 may use backhaul services, for example, to communicate with a larger network, such as the Internet or a public switched telephone network.

In some aspects, Quality of Service (QoS) functionality may be included in the network 102. Traffic in the network 102 may be prioritized according to access categories (ACs), including voice, video, best effort, and background. Priority values may further be assigned to the access categories. Data packets transmitted by stations 106 and access point 104 are prioritized based on the particular access category and/or its priority value. For example, voice may be less tolerant to packet delays and thus may be given priority over video. As a result, voice packets may have a higher probability of being transmitted successfully than video packets by having a higher priority on the transmission channel. This may be accomplished by giving higher priority traffic a lower transmit wait time than lower priority traffic. In some aspects, the transmit opportunity for a station 106 may be longer when it is transmitting packets having a higher priority access category than if it is transmitting lower priority packets. In some aspects, the quality of service functionality may be implemented in the media access control (MAC) layer.

In some aspects, various types of management frames may be utilized by stations 106 and/or access point 104 to establish and maintain communications with various access points and stations on the network 102. In some aspects, management frames may include an authentication frame transmitted by a station 106 to the access point 104 for authentication on the network 102. Management frames may further include an association request, as described above. In some aspects, the management frame may include a reassociation request frame. For example, station 106 may transmit a reassociation request frame to a new access point 104 if the station 106 moves away from the access point 104 that it is currently associated with and discovers that the new access point 104 has a stronger beacon signal. The new access point 104 may then obtain any buffered units that are in the buffer of the previously associated access point 104 and are waiting for transmission to the station 106. In some aspects, the management frame may include a beacon signal, as described above. Those of skill in the art will appreciate that various other types of management frames may be transmitted by stations 106 or access point 104 to manage communications on the network 102.

Figure 2:
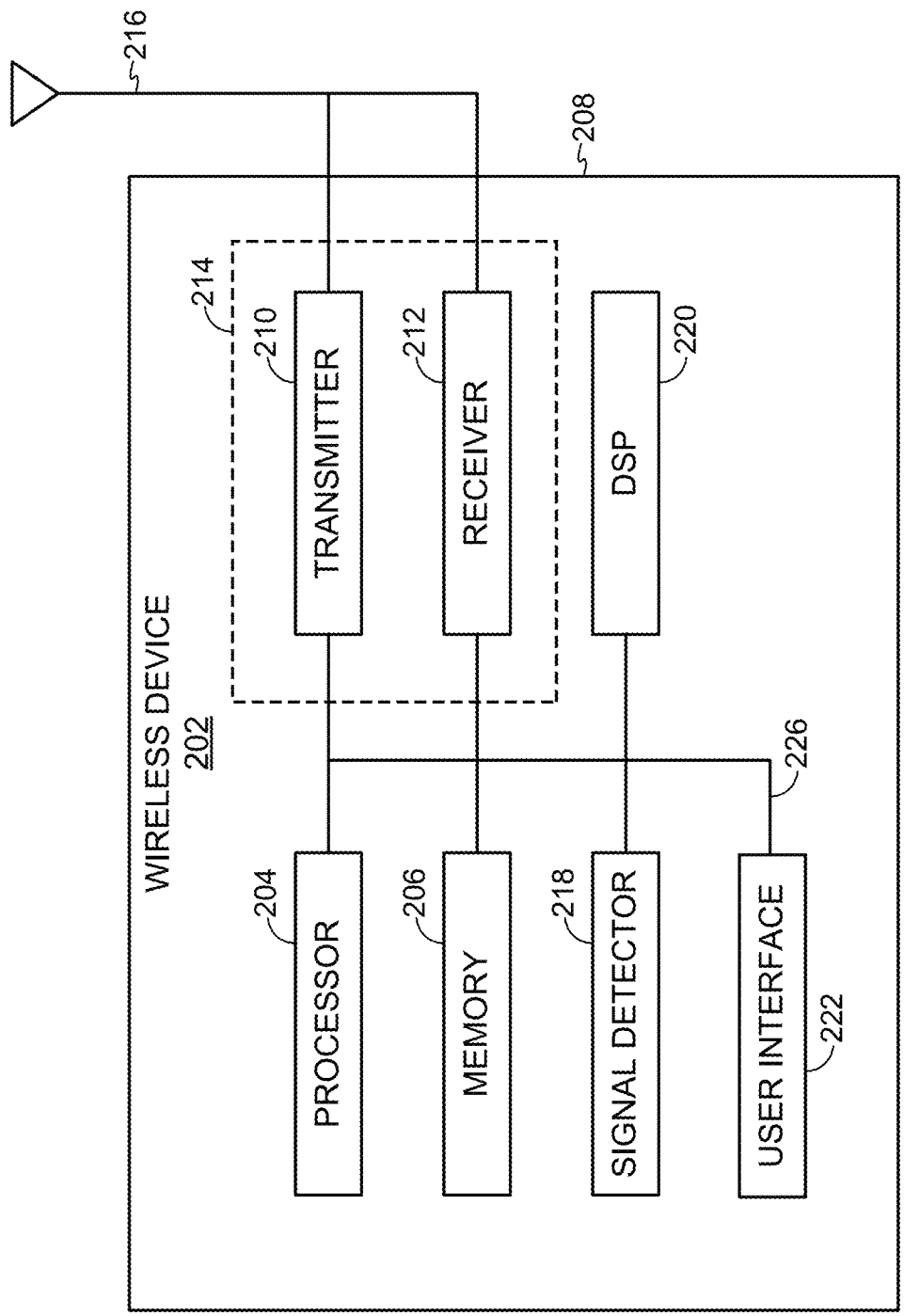
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may include the access point 104 or one of the stations 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory. The processor 204 typically performs logical and arithmetic operations based on program instructions stored within the memory 206. The instructions in the memory 206 may be executable to implement the methods described herein.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a station 106, the processor 204 may be configured to process paging messages. When the wireless device 202 is implemented or used as an access point 104, the processor 204 may also be configured to generate paging messages.

The receiver 212 may be configured to wirelessly receive paging messages. When the wireless device 202 is implemented or used as a station 106, the transmitter 210 may be configured to transmit requests for data in response to the paging messages. For example, the wireless device 202 can be configured to transmit a Power-Saving Poll (PS-Poll) as will be described herein with respect to FIG. 4. When the wireless device 202 is implemented or used as an access point 104, the transmitter 210 may be further configured to transmit data to the one or more stations 106. When the wireless device 202 is implemented or used as a station 106, the transmitter 210 may be configured to transmit an acknowledgement to the data received from the access point 104.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission.

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may include an access point 104 or a station 106, and may be used to transmit and/or receive communications including paging messages. That is, either access point 104 or stations 106 may serve as transmitter or receiver devices of paging messages. Certain aspects contemplate signal detector 218 being used by software running on memory 206 and processor 204 to detect the presence of a transmitter or receiver.

The station 106 may have a plurality of operational modes. For example, the station 106 may have a first operational mode referred to as an active mode. In the active mode, the station 106 may always be in an "awake" state and actively transmit/receive data with the access point 104. Further, the station 106 may have a second operational mode referred to as a power save mode. In the power save mode, the station 106 may be in the "awake" state or a "doze" or "sleep" state where the station 106 does not actively transmit/receive data with the access point 104. For example, the receiver 212 and possibly at least one of the DSP 220 and signal detector 218 of the station 106 may operate using reduced power consumption in the doze state. Individual components of a device may operate in different states; for example, in a device with two receivers, wherein one of the receivers is a low power receiver (not shown), the low power receiver may be in an awake state while receiver 212 is in the doze state. Further, in the power save mode, the station 106 may occasionally enter the awake state to listen to messages from the access point 104 (e.g., paging messages) that indicate to the station 106 whether or not the station 106 needs to "wake up" (e.g., enter the awake state) at a certain time so as to be able to transmit/receive data with the access point 104.

For some implementations, the operational states in which station 106 operates are referred to as a first state and a second state. The first state corresponds to an "awake" state, wherein the station is configured to receive buffered units or sets of data. The second state corresponds to a "sleep" state wherein the station is configured to not receive buffered units or sets of data. For some implementations, the second state consumes less power than the first state. Accordingly, in certain wireless communication systems 100, the access point 104 may transmit paging messages to a plurality of stations 106 in a power save mode in the same network as the access point 104, indicating whether or not there is data buffered at the access point 104 for the stations 106. The stations 106 may also use this information to determine whether they need to be in an awake state or a doze state. For example, if a station 106 determines it is not being paged, it may enter a doze state. Alternatively, if the station 106 determines it may be paged, the station 106 may enter an awake state for a certain period of time to receive the page and further determine when to be in an awake state based on the page. Further, the station 106 may stay in the awake state for a certain period of time after receiving the page. In another example, the station 106 may be configured to function in other ways when being paged or not being paged that are consistent with this disclosure.

In some aspects, paging messages may include a bitmap (not shown in this figure), such as a traffic indication map (TIM). In certain such aspects, the bitmap may include a number of bits. These paging messages may be sent from the access point 104 to stations 106 in a beacon or a traffic indication map frame. Each bit in the bitmap may correspond to a particular station 106 of a plurality of stations 106, and the value of each bit (e.g., 0 or 1) may indicate the state the corresponding station 106 should be in (e.g., doze state or awake state) to be able to receive Buffered Units (BUs) that the access point 104 has for that particular station. Accordingly, the size of the bitmap may be directly proportional to the number of stations 106 in the wireless communications system 100. Therefore, a large number of stations 106 in the wireless communications system 100 may result in a large bitmap.

In some aspects, stations 106 that sleep for a long time may not wake up to read any traffic indication map messages. For example, a station 106 can decide to sleep through one or more traffic indication map messages in an extended sleep mode. In this case, the station 106 may advertise to the access point 104 that the station 106 may not read any traffic indication map messages. Accordingly, the access point 104 may not include the corresponding identifiers in the traffic indication map message. In various embodiments, the stations 106 can notify the access point 104 that they may not wake up for one or more traffic indication map messages (i.e., that they are operating in the aforementioned power saving mode) using a control message, or immediately during association.

For stations 106 that have notified the access point 104 in this manner, the access point 104 may not include identifiers in the traffic indication map message, even when it has buffered units intended for them. Stations 106 may claim their buffered units by sending a PS-Poll at any time to the access point 104. In an embodiment, access point 104 may immediately send the buffered unit in response to the PS-Poll. In another embodiment, the access point 104 may respond to the PS-Poll with an ACK, and deliver the buffered unit at a later time. In yet another embodiment, the access point 104 may not immediately respond (neither with ACK nor with buffered unit) to a PS-Poll. The access point 104 may instead reply with a Cumulative ACK frame sent after a given scheduled time after the traffic indication map message.

In various embodiments, the station 106 can specify the waiting time to deliver the buffered unit via the PS-Poll (for a dynamic indication), an association request, a probe request, and/or another management frame sent to the access point 104 (for a static indication). In other embodiments, the access point 104 can specify the waiting time to deliver the buffered unit via an ACK frame, a traffic indication map element (for a dynamic indication), a beacon, an association response, a probe response, or other management frames sent to the station 106 (for a static indication). The station 106 may go to sleep for the waiting time duration. The station 106 may acknowledge correct reception of the buffered unit by sending an ACK. The station 106 may then go back to sleep.

Figure 3:
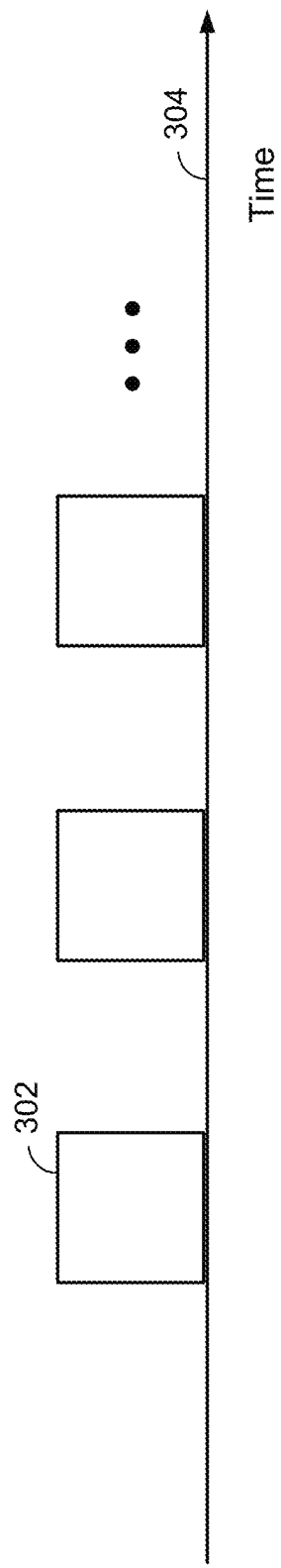
FIG. 3 illustrates a plurality of partitioned paging messages transmitted by an access point to wireless stations in the wireless communication system of FIG. 1.

FIG. 3 illustrates a plurality of partitioned paging messages 302 transmitted by the access point 104 to stations 106 in the wireless communication system 100 of FIG. 1. As shown, time increases horizontally across the page over the time axis 304. As shown, the access point 104 is configured to transmit a plurality of paging messages 302. The paging messages 302 may be sent in a traffic indication map frame, a beacon, or using some other appropriate signaling. The paging messages 302 may indicate a particular station 106 in the paging message. The stations 106 may be configured to listen to one or more of the paging messages 302. Following the one or more paging messages 302, the stations 106 may be configured to transmit requests to the access point 104 and receive a response from the access point 104. For example, one or more stations 106 may transmit a PS-Poll at any time to the access point 104 to claim Buffered Units (BUs) that the access point 104 has to send to the paged stations 106.

Transmission of PS-Polls by stations 106 requires large amounts of energy and may occupy airtime, may potentially cause collisions by increasing the medium occupancy, and may further introduce delay into the network. For example, the paging process may result in a high number of stations 106 receiving the one or more paging messages 302. As a result, for example, a high number of stations 106 indicated in the same traffic indication map may receive the one or more paging messages 302, which may lead to one or more stations 106 contending to transmit requests to the access point 104 on the medium after receiving the traffic indication map. Accordingly, collisions resulting in corrupted data received by the access point 104 may occur in situations in which at least two stations 106 attempt to transmit requests to the access point 104 at or nearly at a same time.

Accordingly, systems and methods are described herein for enhancing paging messages by filtering the type of data that is transmitted to and from stations 106 and/or access point 104 and for accumulating buffered data. The use of such enhanced paging messages allows for less power to be consumed by stations 106 and reduces the amount of airtime, medium occupancy, and delay that is introduced into the network. For example, the stations 106 may not have an immediate use for a Buffered data Unit (BU) that is available for it at the access point 104. Therefore, to save energy and to reduce the potential for collisions, packets available for a station 106 may be accumulated in the access point 104 buffer until a particular criteria is satisfied.

Figure 4:
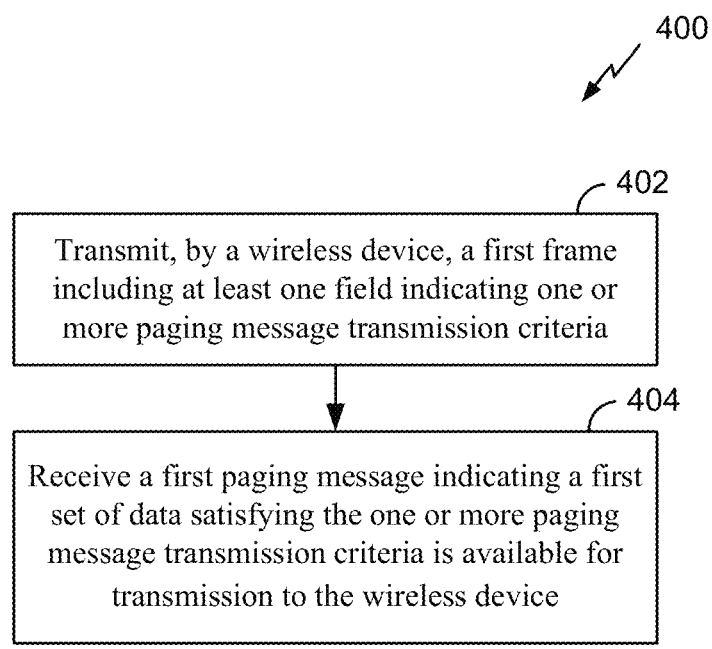
FIG. 4 is a flowchart of a process for filtering data in the wireless communication system of FIG. 1.

FIG. 4 illustrates a flowchart 400 of an exemplary method for wireless communications. At block 402, the method transmits, by a wireless device, a first frame including at least one field indicating one or more paging message transmission criteria. In some aspects, the paging message transmission criteria may be used for filtering the type of information that is received by a station 106. For example, the first frame may include a management frame. In some aspects, the management frame is an association frame, for example. In some aspects, the management frame is a reassociation frame. The one or more paging message transmission criteria may include categories of data, such as quality of service access categories (ACs). For example, a station 106 may include in a management frame a field indicating that it is only interested in being included in a paging message if data packets of a particular access category are buffered for the station 106 at the access point 104. As an example, a station 106 may include data in a field of the management frame indicating to the access point 104 that it is only to be included in a paging message if voice and/or video buffered units (BUs) are buffered at the access point 104 and are ready for transmission to the station 106. As a result, the station 106 will only poll the access point 104 if buffered units of the particular access category are buffered for the station 106 at the access point 104. In some aspects, the one or more paging message transmission criteria may include a station 106 address. For example, the station 106 may indicate to the access point 104 that the particularly addressed station 106 is not to be included in a paging message, and therefore awoken, for a specific period of time. In some aspects, the one or more paging message transmission criteria may include a station 106 type. For example, the station 106 may indicate its access category in the field, which may direct the access point 104 to only include the station 106 in the paging message if a buffered unit of a particular access category is buffered for the station 106. As an example, the station 106 may include an indication in the field that it is a sensor. In response, the access point 104 may determine that it will include the station 106 in the paging message only if sensor data included in a particular access category is buffered for the station 106 at the access point 104. As an example, the particular access category may be Voice (VO), Best Efforts (BE), or a new category named Sensor Access Category (SE-AC). In some aspects, the access point 104 may aggregate or accumulate buffered units designated for the station 106 in the buffer until buffered units satisfying the paging message transmission criteria indicated in the frame are available for transmission to the station 106. Details regarding accumulated buffering of buffered units by the access point 104 will be further described below with regard to FIG. 9.

At block 404, the method receives, at the wireless device, a first paging message indicating a first set of data satisfying the one or more paging message transmission criteria is available for transmission to the wireless device. For example, if buffered units satisfying the specified access category are available in the buffer for transmission to the station 106, a paging message may be received by a station 106. In response to receiving the paging message, the station 106 determines whether it needs to wake up from a doze state and enter an awake state as discussed above. The station 106 may then awake and transmit a PS-Poll to the access point 104 in order to claim any accumulated Buffered Units (BUs) that the access point 104 has to send to the paged stations 106. In some aspects, in response to the PS-Poll, the access point 104 may transmit all buffered units that have accumulated in its buffer for the particular station 106. In some aspects, the access point 104 may discard any data that does not satisfy the particular access category indicated by the station 106 in the transmitted frame (e.g., the management frame). In some aspects, an station 106 may sleep through one or more paging messages when buffered units available for transmission to the wireless device are buffered at the access point 104 and do not satisfy the one or more paging message transmission criteria. The station 106 may continue to doze until data packets satisfying the specified access category are buffered at the access point 104 as buffered units, and the access point 104 includes the station 106 in a paging message.

In some aspects, the station 106 may include one or more buffer threshold requirements in the first frame. For example, in addition to including one or more paging message transmission criteria in the frame, the station 106 may include buffer threshold requirements in the frame. The buffer threshold requirements may indicate to the access point 104 when to stop accumulating buffered units and to include the station 106 in a paging message so that the buffered units may be transmitted to the station 106. In some aspects, the buffer threshold requirement may be a maximum occupied buffer size. For example, the station 106 may include a maximum occupied buffer size in the frame to indicate to the access point 104 an amount or number of buffered units to accumulate before including the station 106 in the paging message. Once the maximum amount of buffered units has been accumulated in the buffer, the access point 104 may include the station 106 in a paging message so that the station 106 can awake and transmit a PS-Poll to retrieve the buffered units. In some aspects, the access point 104 may discard any buffered units that are not of a particular access category upon the maximum occupied buffer size being met. In some aspects, the buffer threshold requirement may be a maximum time limit. For example, the station 106 may include a maximum time limit, or a time out, in the frame to indicate to the access point 104 an amount of time to accumulate buffered units before including the station 106 in the paging message. Once the maximum time limit has been reached, the access point 104 may include the station 106 in a paging message so that the station 106 can awake and transmit a PS-Poll to retrieve the buffered units. In some aspects, the access point 104 may discard any buffered units that are not of a particular access category upon the maximum time limit being reached. In some aspects, as described below with respect to FIG. 9, the access point 104 may determine the buffer threshold requirements.

Figure 5:
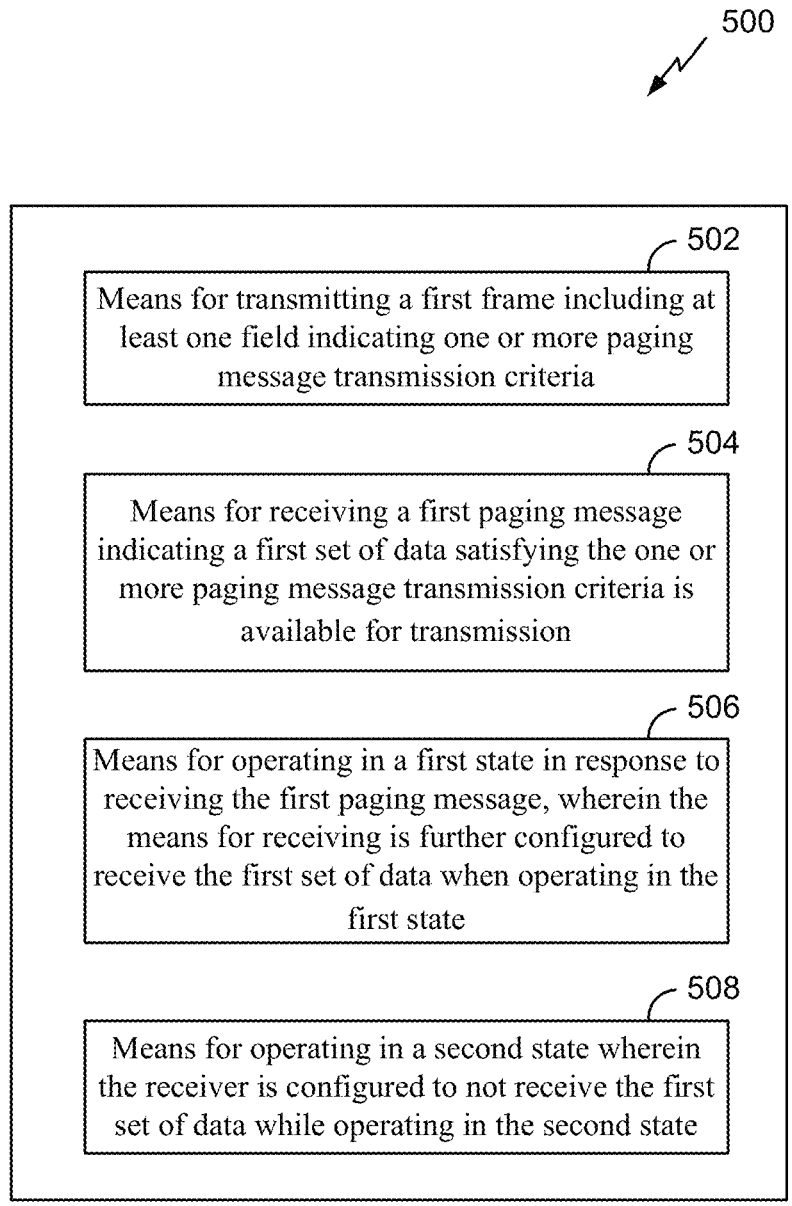
FIG. 5 is a functional block diagram of an exemplary wireless device that may be employed within the wireless communication system of FIG. 1.

FIG. 5 illustrates a functional block diagram of an exemplary wireless device 500 that may be employed within the wireless communication system 100. The device 500 comprises means 502 for transmitting a first frame including at least one field indicating one or more paging message transmission criteria. The device 500 further comprises means 504 for receiving a first paging message indicating a first set of data satisfying the one or more paging message transmission criteria is available for transmission. The device 500 further comprises means 506 for operating in a first state in response to receiving the first paging message, wherein the means for receiving 504 is further configured to receive the first set of data when operating in the first state. The device further comprises means 508 for operating in a second state wherein the receiver is configured to not receive the first set of data while operating in the second state.

The means 502 for transmitting a first frame may be configured to perform one or more of the functions discussed above with respect to the block 402 illustrated in FIG. 4. The means 502 for transmitting a first frame may correspond to one or more of the transmitter 210, the processor 204, the transceiver 214, and the memory 206, discussed above with respect to FIG. 2. The means 504 for receiving a first paging message may be configured to perform one or more of the functions discussed above with respect to the block 404 illustrated in FIG. 4. The means 504 for receiving a first paging message may correspond to one or more of the receiver 212, the processor 204, the transceiver 214, and the memory 206, discussed above with respect to FIG. 2.

Figure 8:
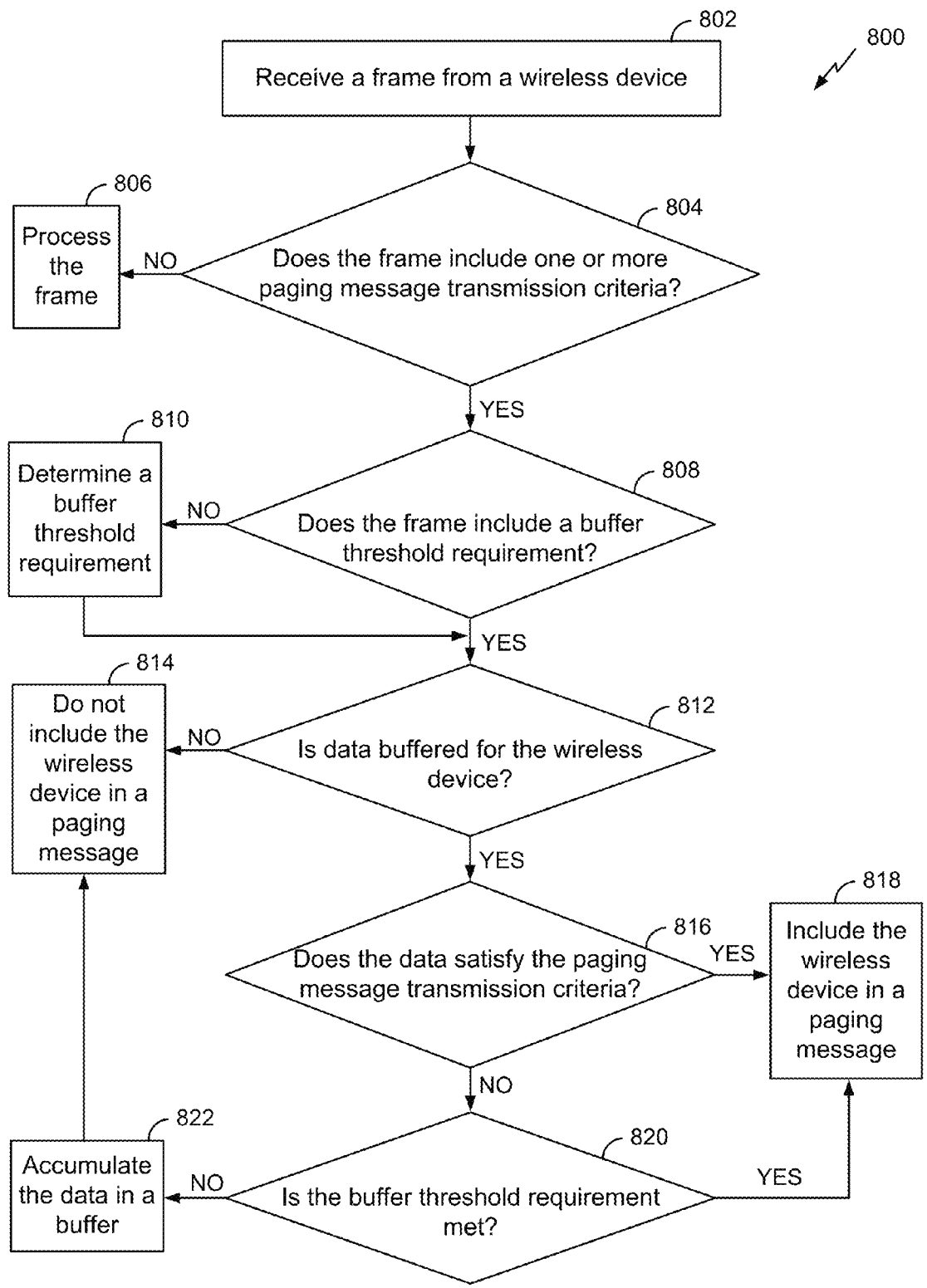
FIG. 8 is a flowchart of another embodiment of a process for transmitting data in the wireless communication system of FIG. 1.

The means 506 for operating in a first state may be configured to receive buffered units in response to receiving a paging message that includes the wireless device in corresponding to block 818 in FIG. 8. The means 506 for operating in a first state may correspond to one or more of the receiver 212, the transceiver 214, the processor 204, the signal detector 218, the DSP 220, and the memory 206, discussed above with respect to FIG. 2.

The means 508 for operating in a second state corresponds to a sleep state when the device is not configured to receive buffered units. The means 508 for operating in a second state may correspond to one or more of the receiver 212, the transceiver 214, and the processor 204, discussed above with respect to FIG. 2.

Figure 6:
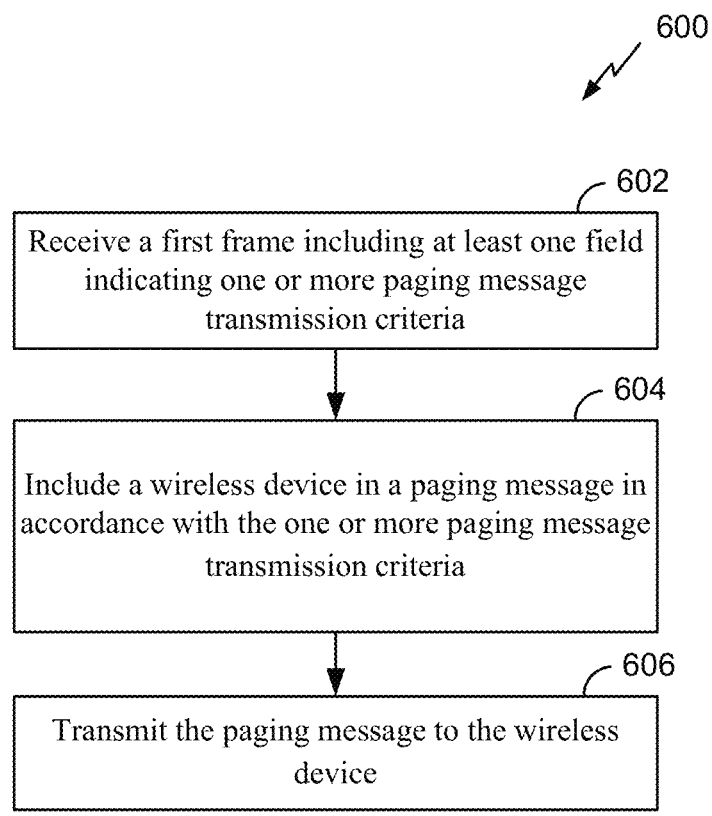
FIG. 6 is a flowchart of a process for transmitting data in the wireless communication system of FIG. 1.

FIG. 6 illustrates a flowchart 600 of an exemplary method for wireless communications. At block 602, the method receives a first frame including at least one field indicating one or more paging message transmission criteria. In some aspects, the paging message transmission criteria may be used for filtering the type of information that is transmitted by access point 104 and received by a station 106. For example, the first the first frame may include a management frame. In some aspects, the management frame may include an association frame or a reassociation frame. The one or more paging message transmission criteria may include categories of data. The categories of data may include quality of service access categories (ACs).

At block 604, the method includes a wireless device in a paging message in accordance with the one or more paging message transmission criteria. In some aspects, the frame received by an access point 104 may include a field indicating that a station 106 is only interested in being included in a paging message if data packets of a particular access category are buffered for the station 106 at the access point 104. For example, a field of a management frame may include data indicating to the access point 104 to only include the station 106 in a paging message if voice buffer units (BUs) are buffered at the access point 104 and are ready for transmission to the station 106. In some aspects, the one or more paging message transmission criteria may include a station 106 address. For example, frame may indicate to the access point 104 that the particularly addressed station 106 is not to be included in a paging message, and therefore awoken, for a specific period of time. In some aspects, the one or more paging message transmission criteria may include a station 106 type. For example, the access point 104 may determine from the frame that the station 106 is a sensor, and may only include the station 106 in the paging message if a buffered unit of a particular access category is buffered for the station 106. As an example, the frame may indicate in the field that the station 106 is a sensor and the access point 104 may determine that it will include the station 106 in the paging message only if sensor data included in a best efforts access category is buffered for the station 106 at the access point 104.

At block 606, the method transmits the paging message to the wireless device. For example, the access point 104 will include the station 106 in a paging message and will transmit the paging message to the wireless device if buffered units of the specified access category are buffered at the access point 104.

In some aspects, the access point 104 may aggregate or accumulate buffered units designated for the station 106 in the buffer until buffered units satisfying the paging message transmission criteria indicated in the frame are available for transmission to the station 106 or until one or more buffer threshold requirements are met. For example, the frame received by the access point 104 may include one or more buffer threshold requirements in addition to, or in lieu of, the paging message transmission criteria. In some aspects, the buffer threshold requirements may indicate to the access point 104 when to stop accumulating buffered units and to include the station 106 in a paging message so that the buffered units may be transmitted to the station 106. In some aspects, the buffer threshold requirement may be a maximum occupied buffer size, as described above. In some aspects, the buffer threshold requirement may be a maximum time limit, as described above. In some aspects, once the buffer threshold requirement has been met, the access point 104 may include the station 106 in a paging message so that the station 106 can awake and retrieve any buffered units that are available for transmission. In some aspects, in response to receiving a PS-Poll from the station 106, the access point 104 may transmit all buffered units that have accumulated in its buffer to the particular station 106. In some aspects, the access point 104 may discard any buffered units that are not of a particular specified access category in response to the buffer threshold requirement being met or in response to the PS-Poll.

In some aspects, the access point 104 may determine the buffer threshold requirements even if the buffer threshold requirements are not included in a frame transmitted from a station 106. For example, the access point 104 may determine a period of time to accumulate buffered units or an amount of buffered units to accumulate for a station 106 based on the type of station for which buffered units are designated. As another example, the access point 104 may determine buffer threshold requirements based on an address of a particular station 106 for which stored buffered units are designated. The access point 104 may determine the type or address of a station 106 based on a management frame transmitted from the station 106.

Figure 7:
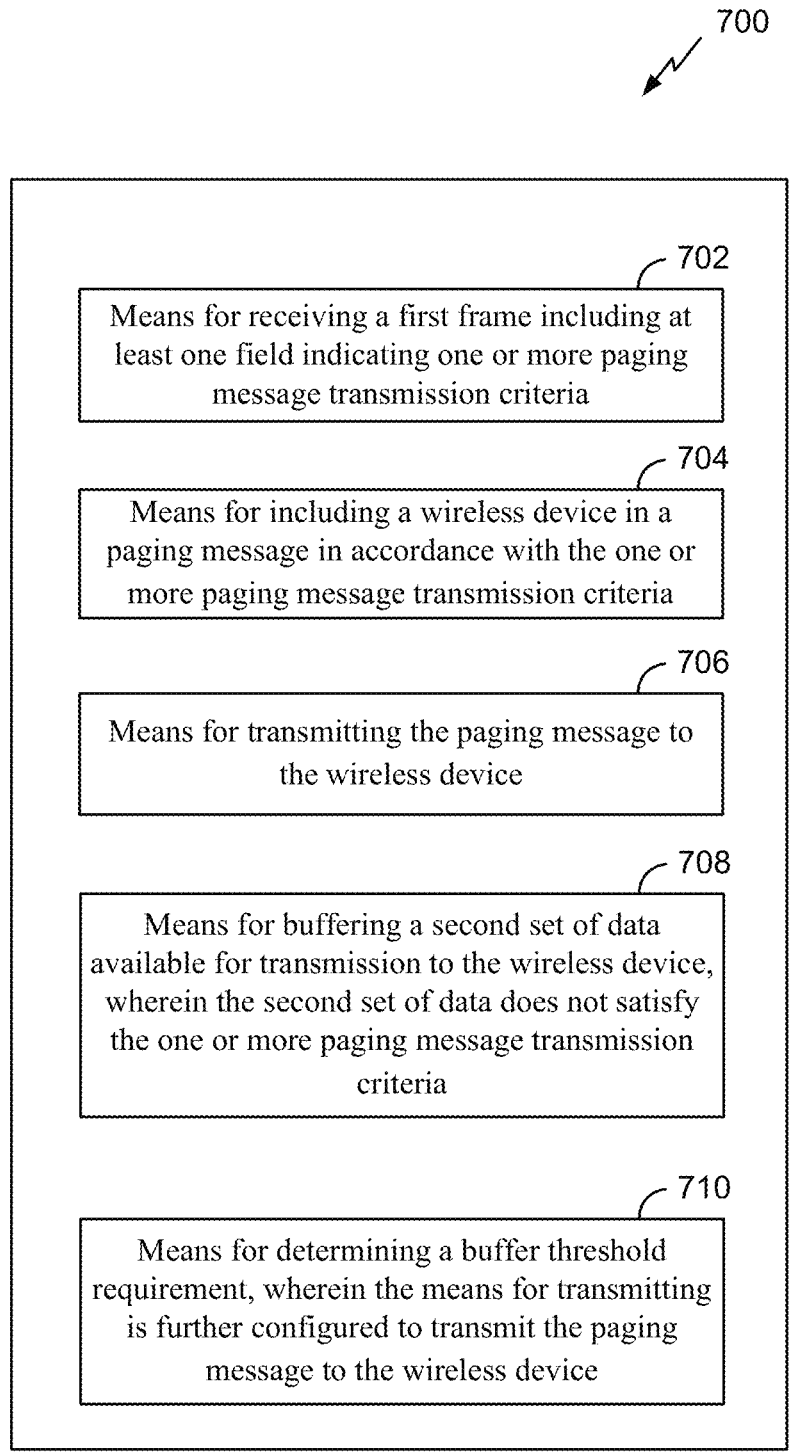
FIG. 7 is a functional block diagram of an exemplary wireless device that may be employed within the wireless communication system of FIG. 1.

FIG. 7 illustrates a functional block diagram of an exemplary wireless device 700 that may be employed within the wireless communication system 100. The device 700 comprises means 702 for receiving a first frame including at least one field indicating one or more paging message transmission criteria. The device 700 further comprises means 704 for including a wireless device in a paging message in accordance with the one or more paging message transmission criteria. The device 700 further comprises means 706 for transmitting the paging message to the wireless device. The device 700 further comprises means 708 for buffering a second set of data available for transmission to the wireless device, wherein the second set of data does not satisfy the one or more paging message transmission criteria. The device 700 further comprises means 710 for determining a buffer threshold requirement, wherein the means for transmitting 706 is further configured to transmit the paging message to the wireless device.

The means 702 for receiving a first frame may be configured to perform one or more of the functions discussed above with respect to the block 602 illustrated in FIG. 6. The means 702 for receiving a first frame may correspond to one or more of the receiver 212, the processor 204, the transceiver 214, and the memory 206, discussed above with respect to FIG. 2. The means 704 for including a wireless device in a paging message may be configured to perform one or more of the functions discussed above with respect to the block 604 illustrated in FIG. 6. The means 704 for including a wireless device in a paging message may correspond to one or more of the processor 204 and the memory 206, discussed above with respect to FIG. 2. The means 706 for transmitting the paging message may be configured to perform one or more of the functions discussed above with respect to the block 606 illustrated in FIG. 6. The means 706 for transmitting the paging message may correspond to one or more of the transmitter 210, the processor 204, the transceiver 214, and the memory 206, discussed above with respect to FIG. 2.

The means 708 for buffering a second set of data may be configured to perform one or more of the functions of block 822 illustrated in FIG. 8. The means 708 for buffering may correspond to one or more of the processor 204 and the memory 206, discussed above with respect to FIG. 2. The means 710 for determining a buffer threshold requirement may be configured to perform one or more of the functions of block 810 illustrated in FIG. 8. The means 710 for determining may correspond to one or more of the processor 204 and the memory 206, discussed above with respect to FIG. 2.

FIG. 8 illustrates a flowchart 800 of an exemplary method for filtering and accumulating data for transmission on a wireless network. The method may be implemented by the wireless device 202 acting as an access point 104, for example. At block 802, the method begins by receiving a frame from a wireless device. In some aspects, an access point 104 receives a management frame, such as an association frame or a reassociation frame, from a station 106. At block 804, the method determines whether the frame includes one or more paging message transmission criteria. In some aspects, the paging message transmission criteria may be used for filtering the type of information that is transmitted by access point 104 and received by a station 106. The one or more paging message transmission criteria may include categories of data. In some aspects, the categories of data may include quality of service access categories (ACs). In some aspects, the one or more paging message transmission criteria may include a station 106 address or a station 106 type, as described above. At block 806, if the frame does not include one or more paging message transmission criteria, the method processes the frame. For example, the access point 104 may process a management frame, such as an association frame, without filtering or accumulating any data for the station 106.

At block 808, if the frame includes one or more paging message transmission criteria, the method determines whether the frame includes a buffer threshold requirement. For example, the station 106 may include in the frame a specific buffer threshold requirement. In some aspects, the buffer threshold requirement may be a maximum occupied buffer size or a maximum time limit, as described above. At block 810, if the frame does not include a buffer threshold requirement, the method determines a buffer threshold requirement. For example, the access point 104 may determine the buffer threshold requirements even if buffer threshold requirements are not included in the frame. In some aspects, the access point 104 may determine a period of time to accumulate buffered units or an amount of buffered units to accumulate for a station 106 based on the type of station for which the buffered units are designated. As another example, the access point 104 may determine buffer threshold requirements based on an address of a particular station 106 for which stored buffered units are designated.

At block 812, if the frame includes paging message transmission criteria and at least one buffer threshold requirement, the method determines whether there is data buffered for the wireless device. For example, the access point 104 determines whether there are buffered units designated for the station 106. If there is no data buffered for the wireless device, at block 814, the method does not include the wireless device in a paging message. For example, the access point 104 may include a bit 0 in a bitmap for the station 106. As a result, the station 106 will continue to doze and will not awake in response to the bitmap.

At block 816, if data is buffered for the wireless device, it is determined whether the data satisfies the paging message transmission criteria. For example, the paging message transmission criteria may include specific access categories (ACs) indicating to the access point 104 that an station 106 is only interested in being included in a paging message if data packets or buffered units of the specific access category are buffered for the station 106 at the access point 104. The access point 104 may determine whether the buffered data falls under the access category. At block 818, if the data satisfies the paging message transmission criteria, the method includes the wireless device in a paging message. For example, the access point 104 may include a bit 1 in a bitmap for the station 106. The bitmap may be transmitted to the station 106 and the station 106 will awake in response to the paging message. The station 106 may then transmit a PS-Poll to the access point 104 in order to retrieve the buffered units stored at the access point 104.

At block 820, if the data does not satisfy the paging message transmission criteria, the method determines whether the buffer threshold requirement is met. As discussed above, the access point 104 may aggregate or accumulate buffered units designated for the station 106 in the buffer until buffered units satisfying the paging message transmission criteria indicated in the frame are available for transmission to the station 106 or until one or more buffer threshold requirements are met. At block 818, if the buffer threshold requirements are met, the method includes the wireless device in a paging message. For example, even if the paging message transmission criteria indicated in the frame are not satisfied by the currently buffered units, the access point 104 may include the station 106 in a paging message if the buffer threshold requirements are met. As a result, the station 106 is notified that buffered units are currently buffered at the access point 104 and are available for transmission to the station 106. At block 822, if the buffer threshold requirements are not met and the data does not satisfy the paging message transmission criteria, the method accumulates the data in a buffer. In some aspects, the access point 104 may discard any buffered units that are not of a particular specified access category in response to the buffer threshold requirement being met. At block 814, the method does not include the wireless device in a paging message in response to determining that the buffer threshold requirement has not been met.

An access point 104 may add Quality of Service (QoS) access category (AC) information to a paging message in order to indicate to a station 106 the category of data packets that are buffered for the station 106 at the access point 104. As described above, paging messages may include a bitmap, such as a traffic identification map (TIM). In some aspects, the quality of service access category information may be included in the paging message so that the station 106 does not need to include paging message transmission criteria indicating particular categories of data to the access point 104. In other aspects, station 106 may include paging message transmission criteria in the packet sent to the access point 104 and, in addition, the access point 104 may include the quality of service access category information in the paging message sent to the station 106.

As discussed above, each bit in a bitmap may correspond to a particular station 106 of a plurality of stations 106, and the value of each bit may indicate the state the corresponding station 106 should be in (e.g., doze state or awake state) to be able to receive buffered units that the access point 104 has for that particular station. Therefore, the size of the bitmap may be directly proportional to the number of stations 106 in the wireless communications system 100, and may potentially be very large. Accordingly, prior to adding the quality of service access category information to a paging message, the access point 104 may initially divide bits of the paging message into blocks. This allows the paging message to be transmitted in blocks instead of a single paging message being transmitted with every station included therein. The various stations 106 on the network 100 may be grouped into the blocks according to particular station criteria. In some aspects, the station criteria may include quality of service access categories. For example, all stations that receive only voice traffic may be grouped into a first block. As another example, all stations that receive voice and video may be grouped into a second block. As a third example, all stations that receive voice or video or best efforts data traffic may be grouped into a third group. A single station may be grouped into multiple blocks. For example, a station that receives voice only may be included in a block that includes stations that receive voice or video and also in a block that includes stations that receive voice only. Those of skill in the art will appreciate that various other permutations of station criteria may be used in order to group the stations into the blocks of the paging message.

The access point 104 may add the quality of service access category information to a paging message by appending an n-bit access category indication to each block of the paging message. For example, a 2-bit access category indication may be appended to the beginning or the end of the block in order to indicate to the station 106 the category of buffered units that are buffered at the access point 104 for the station 106. As an example, a 01 appended to a block may indicate to a station 106 grouped in the block that the access point 104 has buffered voice data for the station 106. As other examples, an appended 10 may indicate that the access point 104 has buffered video data, and an appended 11 may indicate that the access point 104 has buffered best effort type data. A 00 appended to the block may indicate that there is no data buffered in the access point 104 for the particular station 106 grouped into the block. In response, the station 106 may determine whether to awake and send a PS-Poll to the access point 104 depending on the category of buffered units. The n-bit access category indication may also indicate to the station 106 the highest priority buffered units that are buffered at the access point 104.

In some aspects, the access point 104 may add the quality of service access category information to a paging message by transmitting each block twice instead of only once. The station 106 will decode a single bit in each block in order to determine the category of data that the access point 104 has buffered for the station 106. For example, if the station 106 decodes a 1 the first time the block is received, and decodes a 0 the second time the block is received, the station 106 may determine that the access point 104 has buffered video data for the station 106. In response to receiving the blocks indicating the category of buffered units, the station 106 may determine whether to awake and send a PS-Poll to the access point 104 in order to retrieve the buffered data.

In some aspects, the access point 104 may add the quality of service access category information to a paging message by including an n-bit access category indication at the end of the block only for paged stations. In some aspects, the access point 104 may include an n-bit access category indication after a bit corresponding to a paged station. For example, the access point 104 may include two bits at the end of a block only for paged stations. As an example, for a regular paging message (e.g., a traffic indication map bitmap) [0 0 0 1 0], the paging message indicates that an station corresponding to association ID (AID) 4 is paged and stations corresponding to AIDs 1, 2, 3, and 5 do not have any buffered data at AP, and thus are not paged. In this example, the access point 104 may enhance the traffic indication map bitmap to include two bits at the end of the block to indicate the access category. For example, the enhanced traffic indication map bitmap may be [0 0 0 1 0: 10], where the last two bits 10 may indicate to the paged station (i.e., station with AID 4) the access category of buffered units present at the access point 104. For example, the 10 may indicate the most important buffered data category of the paged station according to quality of service parameters. As another example, a regular traffic indication map bitmap [0 0 1 0 1 0] may be enhanced to [0 0 1 0 1 0: 01 11]

or [0 0 1:01 0 1:11 0], which both indicate that there are buffered units of data type 01 (e.g., Voice data) for the station corresponding to AID 3 and that there are buffered units of data type 11 (e.g., Best Efforts type data) for station 5.

In some implementations, the position of the stations 106 within a paging message or block may be dependent on various criteria, including quality of service requirements, power saving requirements, or other performance parameters. For example, the stations 106 may be ordered in the paging message, or in blocks of the paging message according to the access category information specified in a management frame transmitted to the access point 104.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may include non-transitory computer readable medium (e.g., tangible media). In addition, in some aspects computer readable medium may include transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications comprising:
transmitting, by a wireless device to an access point of a wireless access network, a first frame including at least one field indicating one or more paging message transmission criteria and parameters indicating a buffer threshold requirement; and
receiving, at the wireless device from the access point, a first paging message based on the buffer threshold requirement, wherein the first paging message indicates a first set of data satisfying the one or more paging message transmission criteria is available at the access point for transmission to the wireless device.

2. The method of claim 1, further comprising:
operating, by the wireless device, in a first state in response to receiving the first paging message, wherein the wireless device is configured to receive the first set of data when operating in the first state; and
receiving, by the wireless device, the first set of data.

3. The method of claim 2, further comprising:
operating, by the wireless device, in a second state, wherein the wireless device is configured to not receive the first set of data when operating in the second state;
transitioning, by the wireless device, from the second state to the first state in response to receiving a second paging message indicating a second set of data satisfying the one or more paging message transmission criteria is available for transmission to the wireless device; and
receiving, by the wireless device, the second set of data.

4. The method of claim 3, wherein the one or more paging message transmission criteria comprise an amount of time the wireless device is in the second state.

5. The method of claim 1, further comprising receiving the first paging message in response to the buffer threshold requirement being satisfied.

6. The method of claim 1, wherein the buffer threshold requirement is a maximum occupied buffer size.

7. The method of claim 1, wherein the buffer threshold requirement is a maximum time limit.

8. The method of claim 1, wherein the one or more paging message transmission criteria comprise one or more categories of data.

9. The method of claim 8, wherein the one or more categories of data include quality of service access categories.

10. The method of claim 1, wherein the first frame comprises a management frame.

11. The method of claim 1, wherein the first frame is transmitted when the wireless device is associated with an access point of a wireless network.

12. A wireless device comprising:
a transmitter configured to transmit to an access point of a wireless access network a first frame including at least one field indicating one or more paging message transmission criteria and parameters indicating a buffer threshold requirement; and
a receiver configured to receive from the access point a first paging message based on the buffer threshold requirement, wherein the first paging message indicates a first set of data satisfying the one or more paging message transmission criteria is available at the access point for transmission to the wireless device.

13. The wireless device of claim 12, further comprising a processor configured to operate the wireless device in a first state in response to receiving the first paging message, wherein the receiver is further configured to receive the first set of data when operating in the first state.

14. The wireless device of claim 13, further comprising a processor configured to operate the wireless device in a second state, wherein the receiver is configured to not receive the first set of data when operating in the second state.

15. The wireless device of claim 14, wherein the one or more paging message transmission criteria comprise an amount of time the wireless device is in the second state.

16. The wireless device of claim 12, wherein the receiver is further configured to receive the first paging message in response to the buffer threshold requirement being satisfied.

17. An apparatus for wireless communications comprising:
means for transmitting, by a wireless device to an access point of a wireless access network, a first frame including at least one field indicating one or more paging message transmission criteria and parameters indicating a buffer threshold requirement;
means for receiving from the access point a first paging message based on the buffer threshold requirement, wherein the first paging message indicates a first set of data satisfying the one or more paging message transmission criteria is available at the access point for transmission to the apparatus;
means for operating in a first state in response to receiving the first paging message, wherein the means for receiving is further configured to receive the first set of data when operating in the first state; and
means for operating in a second state, wherein the receiver is configured to not receive the first set of data while operating in the second state.

18. A non-transitory computer-readable medium comprising code that, when executed by one or more processors, causes an apparatus to:
transmit, by a wireless device to an access point of a wireless access network, a first frame including at least one field indicating one or more paging message transmission criteria and parameters indicating a buffer threshold requirement;
receive from the access point a first paging message based on the buffer threshold requirement, wherein the first paging message indicates a first set of data satisfying the one or more paging message transmission criteria is available at the access point for transmission to the; and
operate in a first state in response to receiving the first paging message, wherein the first set of data is received while operating in the first state.

19. The medium of claim 18, further comprising code that, when executed by one or more processors, causes the apparatus to operate in a second state wherein the apparatus is configured to not receive the first set of data when operating in the second state, transition from the second state to the first state in response to receiving a second paging message indicating a second set of data satisfying the one or more paging message transmission criteria is available for transmission to the apparatus, and receive the second set of data.

20. A method implemented in an access point of a wireless access network for wireless communications comprising:
    receiving, at the access point from a wireless device, a first frame including at least one field indicating one or more paging message transmission criteria;
    determining, at the access point, that a first set of data buffered for the wireless device satisfies the one or more paging message transmission criteria;
    determining a buffer threshold requirement based on the first frame;
    including the wireless device in a paging message based on the one or more paging message transmission criteria and the buffer threshold requirement being met; and
    transmitting the paging message to the wireless device.

21. The method of claim 20, wherein the paging message indicates to the wireless device that the first set of data satisfying the one or more paging message transmission criteria is available for transmission to the wireless device.

22. The method of claim 21, further comprising transmitting the first set of data to the wireless device.

23. The method of claim 21, wherein the one or more paging message transmission criteria comprise an amount of time the wireless device is operating in a second state, wherein the wireless device is configured to not receive the first set of data while operating in the second state.

24. The method of claim 20, further comprising buffering a second set of data available for transmission to the wireless device, wherein the second set of data does not satisfy the one or more paging message transmission criteria.

25. The method of claim 24, further comprising transmitting the second set of data to the wireless device in response to the buffer threshold requirement being met.

26. The method of claim 24, wherein the buffer threshold requirement is a maximum occupied buffer size.

27. The method of claim 24, wherein the buffer threshold requirement is a maximum time limit.

28. The method of claim 20, wherein the one or more paging message transmission criteria comprise one or more categories of data.

29. The method of claim 28, wherein the one or more categories of data include quality of service access categories.

30. The method of claim 20, further comprising adding a quality of service access category to the paging message.

31. The method of claim 20, further comprising determining an order of paged wireless devices according to one or more quality of service access categories.

32. The method of claim 20, further comprising determining a grouping of wireless devices according to one or more quality of service access categories.

33. The method of claim 20, further comprising:
    dividing the paging message into a plurality of blocks, wherein each block of the plurality of blocks corresponds to a group of wireless devices; and
    appending a quality of service access category to each block of the plurality of blocks.

34. An access point of a wireless access network comprising:
    a receiver configured to receive, from a wireless device, a first frame including at least one field indicating one or more paging message transmission criteria;
    a processor configured to determine, at the access point, that a first set of data buffered for the wireless device satisfies the one or more paging message transmission criteria, to determine a buffer threshold requirement based on the first frame and to include the wireless device in a paging message based on the one or more paging message transmission criteria and the buffer threshold requirement being met; and
    a transmitter configured to transmit the paging message to the wireless device.

35. The access point of claim 34, wherein the paging message indicates to the wireless device that the first set of data satisfying the one or more paging message transmission criteria is available for transmission to the wireless device, and the transmitter is further configured to transmit the first set of data to the wireless device.

36. The access point of claim 35, wherein the one or more paging message transmission criteria comprise an amount of time the wireless device is operating in a second state, wherein the wireless device is configured to not receive the first set of data when operating in the second state.

37. The access point of claim 34, wherein the processor is further configured to buffer a second set of data available for transmission to the wireless device,
    wherein the second set of data does not satisfy the one or more paging message transmission criteria.

38. The access point of claim 37, wherein the transmitter is further configured to transmit the second set of data to the wireless device in response to the buffer threshold requirement being met.

39. The access point of claim 34, wherein the processor is further configured to add a quality of service access category to the paging message.

40. The access point of claim 34, wherein the processor is further configured to determine an order of paged wireless devices according to one or more quality of service access categories.

41. The access point of claim 34, wherein the processor is further configured to determine a grouping of wireless devices according to one or more quality of service access categories.

42. The access point of claim 34, wherein the processor is further configured to:
    divide the paging message into a plurality of blocks, wherein each block of the plurality of blocks corresponds to a group of wireless devices; and
    append a quality of service access category to each block of the plurality of blocks.

43. An apparatus for wireless communications comprising:
    means for receiving, at an access point of a wireless access network from a wireless device, a first frame including at least one field indicating one or more paging message transmission criteria;
    means for determining, at the access point, that a first set of data buffered for the wireless device satisfies the one or more paging message transmission criteria;
    means for including the wireless device in a paging message in accordance with the one or more paging message transmission criteria;
    means for transmitting the paging message from the access point to the wireless device;
    means for buffering at the access point a second set of data available for transmission to the wireless device, wherein the second set of data does not satisfy the one or more paging message transmission criteria; and
    means for determining at the access point a buffer threshold requirement based on the first frame, wherein the means for transmitting is further configured to transmit the paging message to the wireless device based on the buffer threshold requirement being met.

44. The apparatus of claim 43, wherein the paging message indicates to the wireless device that a first set of data satisfying the one or more paging message transmission criteria is available for transmission to the wireless device.

45. The apparatus of claim 43, wherein the one or more paging message transmission criteria comprise an amount of time the wireless device is operating in a second state, wherein the wireless device is configured to not receive the first set of data while operating in the second state.

46. A non-transitory computer-readable medium comprising code that, when executed by one or more processors in an access point of a wireless access network, causes an apparatus to:
- receive, from a wireless device, a first frame including at least one field indicating one or more paging message transmission criteria;
- determine, at the access point, that a first set of data buffered for the wireless device satisfies the one or more paging message transmission criteria;
- include the wireless device in a paging message in accordance with the one or more paging message transmission criteria;
- transmit the paging message to the wireless device;
- determine a buffer threshold requirement based on the first frame;
- transmit the paging message to the wireless device based on the buffer threshold requirement being met; and
- transmit a set of data to the wireless device in response to the buffer threshold requirement being met.

47. The medium of claim 46, further comprising code that, when executed by one or more processors, causes the apparatus to:
- divide the paging message into a plurality of blocks, wherein each block of the plurality of blocks corresponds to a group of wireless devices; and
- append a quality of service access category to each block of the plurality of blocks.

* * * * *